United States Patent
Hung et al.

(10) Patent No.: US 9,463,414 B2
(45) Date of Patent: Oct. 11, 2016

(54) DEHUMIDIFYING UNIT, LAYERED TEMPERATURE CONTROL DEHUMIDIFYING ELEMENT, DRYING DEVICE AND METHOD FOR TEMPERATURE CONTROLLING THE SAME

(71) Applicant: INDUSTRIAL TECHNOLOGY RESEARCH INSTITUTE, Hsinchu (TW)

(72) Inventors: Ming-Lang Hung, Hsinchu (TW);
Pen-Chang Tseng, Hsinchu (TW);
Yu-Hao Kang, Hsinchu (TW);
Hsing-Ting Chen, Hsinchu (TW);
Jyi-Ching Perng, Hsinchu (TW);
Shih-Kai Chien, Hsinchu (TW);
Ching-Eenn Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 53 days.

(21) Appl. No.: 14/673,129

(22) Filed: Mar. 30, 2015

(65) Prior Publication Data
US 2016/0059183 A1    Mar. 3, 2016

(30) Foreign Application Priority Data

Aug. 26, 2014 (TW) .............. 103129312 A

(51) Int. Cl.
*B01J 8/12* (2006.01)
*B01D 53/34* (2006.01)
*B01D 53/26* (2006.01)
*B01D 53/04* (2006.01)
*B01J 20/34* (2006.01)

(52) U.S. Cl.
CPC ......... *B01D 53/261* (2013.01); *B01D 53/0438* (2013.01); *B01J 20/3483* (2013.01); *B01D 53/0454* (2013.01); *B01D 2253/102* (2013.01); *B01D 2253/106* (2013.01); *B01D 2253/108* (2013.01); *B01D 2259/40096* (2013.01)

(58) Field of Classification Search
CPC ........... B01J 20/34; B01J 8/12; B01D 53/34; B01D 50/00
USPC ............................................ 502/56; 422/178
See application file for complete search history.

(56) References Cited

U.S. PATENT DOCUMENTS 7,569,095 B2    8/2009 Vanderstraeten et al.
2013/0145779 A1    6/2013 Hwang

FOREIGN PATENT DOCUMENTS

| CN | 102218255 A | 10/2011 |
|---|---|---|
| CN | 203108404 U | 8/2013 |
| JP | S55140701 A | 11/1980 |
| JP | 2001-179037 A | 7/2001 |
| JP | 2007253136 A | 10/2007 |
| JP | 2013013837 A | 1/2013 |
| JP | 2013059760 A | 4/2013 |
| TW | I255330 B | 5/2006 |
| TW | I285131 B | 8/2007 |
| TW | M321979 U | 11/2007 |
| TW | M348921 U | 1/2009 |
| TW | M360314 U | 7/2009 |
| TW | M369437 U | 11/2009 |
| TW | 201026374 A | 7/2010 |
| TW | 201037239 A | 10/2010 |
| TW | I347417 | 8/2011 |
| TW | M416754 U | 11/2011 |
| TW | I367779 B | 7/2012 |

OTHER PUBLICATIONS

Golubovic et al., Influence of Elevated Pressure on Sorption; Numerical Heat Transfer; Apr. 26, 2001; Part A, 45:, pp. 869-886.
Niu et al., Heat Transfer and Friction Coefficients in Corrugated Ducts Confined by Sinusoidal and ARC Curves;; International Journal of heat and Mass Transfer; Apr. 29, 2001; 45 (2002), pp. 571-578.
Ge et al., A Review of the Mathematical Models for Predicting; Renewable and Sustainable Energy Reviews; Jan. 22, 2007; 12 (2008), pp. 1485-1528.
Abe et al., Effectiveness of Energy Wheels From Transient Measurements; International Journal of Heat and Mass Transfer; Oct. 13, 2005; 49 (2006) 52, pp. 52-62.
Glaznev et al., Kinetics of Water Adsorption/Desorption Under Isobaric Stages of Adsorption; International Journal of Heat and Mass transfer; Apr. 26, 2008; 52 (2009), pp. 1774-1777.
Golubovic et al., Sorption Properties for Different Types of Molecular Sieveand Their Influence on Optimum Dehumidification Performance of Desiccant Wheels; International Journal of Heat and Mass Transfer; 200605524; 49 (2006), pp. 2802-2809.
Japan Patent Office, Office Action issued Mar. 7, 2016.

*Primary Examiner* — Edward Johnson
(74) *Attorney, Agent, or Firm* — Rabin & Berdo, P.C.

(57) ABSTRACT

A dehumidifying unit, a layered temperature control dehumidifying element, a drying device and a temperature control method thereof are provided. The dehumidifying element has a plurality of dehumidifying units. The dehumidifying units are made of a direct heating desorption material and used for dehumidifying air by adsorption and capable of being regenerated by desorption. By performing temperature compensation through a preheater and performing a layered temperature control method on the dehumidifying element, the disclosure achieves a uniform temperature control on the air flow passage of the dehumidifying element so as to improve regeneration performance of the dehumidifying element and reduce energy consumption of the drying device.

20 Claims, 11 Drawing Sheets

DEHUMIDIFYING UNIT, LAYERED TEMPERATURE CONTROL DEHUMIDIFYING ELEMENT, DRYING DEVICE AND METHOD FOR TEMPERATURE CONTROLLING THE SAME

CROSS-REFERENCE TO RELATED APPLICATIONS

This application claimed priority to Taiwanese Patent Application No. 103129312, filed on Aug. 26, 2014. The entirety of the above-mentioned patent application is hereby incorporated by reference herein and made a part of this specification.

BACKGROUND DISCLOSURE

1. Technical Field Disclosure

The present disclosure relates to a dehumidifying unit, a layered temperature control dehumidifying element, a drying device and a temperature control method thereof.

2. Description of Related Art

As industrial manufacturing processes are developed toward a trend of high automation and high precision, manufacturing spaces and devices require high-quality air to ensure a high yield. Therein, humidity of compressed air is an important factor influencing a variety of processes. Therefore, humidity control has become an important research topic.

Generally, a conventional adsorption type compressed air drying device has two adsorption towers for adsorbing moisture of compressed air. An adsorbent, such as silica gel, zeolite or activated carbon, is filled in the adsorption towers. The adsorbent is used for dehumidifying air by adsorption and capable of being regenerated by desorption. After compressed air having a high moisture content enters into one of the adsorption towers through pipelines, the moisture content is adsorbed to dehumidify the compressed air. Then, the dehumidified compressed air is directed to a reservoir for storage. Further, when the adsorption tower reaches a saturated adsorption, a heater is generally used to heat the adsorbent inside the adsorption tower to desorb moisture from the adsorbent and regenerate the adsorbent. To perform the moisture desorption and adsorbent regeneration process, air to be used for the process is first heated by radiation, convection or heat and mass transfer to a moisture desorption temperature and then introduced into the adsorption tower for moisture desorption and adsorbent regeneration. After the process, the compressed air with high temperature and high humidity is discharged out of the adsorption tower, and the adsorbent is ready for another air dehumidifying process.

However, during transmission of the hot air to be used for the moisture desorption and adsorbent regeneration process, heat and mass transfer easily occurs between the hot air and pipeline walls, thus causing an energy loss. Further, during the moisture desorption and adsorbent regeneration process, heat is transmitted to the adsorbent by hot air convection. As such, a non-uniform temperature distribution easily occurs. For example, the temperature at the hot air inlet port is highest and the temperature at the outlet port is lowest, thereby prolonging the regeneration time. Furthermore, during the heating process, lower-temperature waste air must be discharged first, thus increasing the energy consumption of the conventional adsorption type compressed air drying device.

Therefore, how to overcome the above-described drawbacks has become critical.

SUMMARY DISCLOSURE

In view of the above-described drawbacks, the present disclosure provides a dehumidifying unit, which comprises: an upper frame and a lower frame each having a plurality of rib portions, wherein a gap is formed between any adjacent two of the rib portions; a plurality of upper screw bolts and lower screw bolts fixed to the upper frame and the lower frame, respectively; a direct heating desorption material wound on the rib portions of the upper frame and the lower frame alternately to form a passage therebetween, wherein the direct heating desorption material has a metal sheet therein between two desorption sides of the direct heating desorption material; and two conductive plates conductively connected to portions of the metal sheet exposed from the two desorption sides of the direct heating desorption material and fixed to the upper frame to form two electrodes.

The present disclosure further provides a layered temperature control dehumidifying element, which comprises: a plurality of dehumidifying units comprising a direct heating desorption material and used for dehumidifying air by adsorption and capable of being regenerated by desorption, wherein the dehumidifying units are respectively disposed in a plurality of air chambers that are separated from one another by at least a partition board, and through holes are formed between the air chambers to allow air to pass through and flow in parallel passages of the air chambers; a preheater disposed at an air inlet end of the layered temperature control dehumidifying element to perform preheating and temperature compensation on a first group of the dehumidifying units and thereby keep the first group of the dehumidifying units at a uniform temperature for regeneration; a plurality of first temperature sensors respectively disposed at central positions of the dehumidifying units to perform temperature monitoring and feedback during regeneration of the dehumidifying units, wherein the first temperature sensors have connectors disposed at one side of the layered temperature control dehumidifying element; and a second temperature sensor disposed at an outlet port of the preheater to perform temperature monitoring and feedback when the preheater performs heating or temperature compensation.

The present disclosure further provides a layered temperature control method for performing a uniform temperature control on a dehumidifying element of a direct heating desorption type drying device during regeneration, which comprises the steps of: performing a heating process, wherein a first dehumidifying unit of the dehumidifying element is heated by a preheater and thereby a plurality of dehumidifying units connected in series with the first dehumidifying unit are heated until the temperature of the dehumidifying element reaches a temperature range for regeneration; performing a temperature maintenance process, wherein heating is activated or stopped according to temperature variation of the individual dehumidifying units so as to maintain the regeneration temperature within a tolerable range; and performing a cooling process, wherein the preheater is stopped from heating the dehumidifying units and cooling air is provided to accelerate cooling of the dehumidifying element.

The present disclosure further provides a direct heating desorption type drying device, which comprises: an air inlet pipeline group; an air outlet pipeline group positioned over the air inlet pipeline group; a plurality of direct heating desorption type drying components connected in parallel, wherein, valves of the air inlet pipeline group and the air outlet pipeline group are switched on/off to control air flowing into pressure tanks of the direct heating desorption type drying components, wherein each of the pressure tanks has a plurality of dehumidifying elements and each of the dehumidifying elements has a preheater to perform preheating and temperature compensation on the dehumidifying element, the pressure tank has air inlet and outlet ports connected to the air inlet and outlet pipeline groups, respectively, and the air flowing into the pressure tank is dehumidified by dehumidifying units of the dehumidifying elements of the pressure tank through adsorption or is used to regenerate the dehumidifying units by desorption; and a heat exchanger in communication with the air inlet pipeline group, the air outlet pipeline group and the valves to condense high-temperature high-humidity air after regeneration of the direct heating desorption type drying components and accelerate cooling of the dehumidifying units.

Therefore, the present disclosure uses a dehumidifying element made of a direct heating desorption material to dehumidify air. Particularly, by performing preheating through a preheater and performing a layered temperature control method on the dehumidifying element, the present disclosure achieves a uniform temperature effect on the air flow passage of the dehumidifying element, thus improving regeneration performance of the dehumidifying element and reducing energy consumption.

DETAILED DESCRIPTION OF PREFERRED EMBODIMENTS

The following illustrative embodiments are provided to illustrate the disclosure of the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "on", "a" etc. are merely for illustrative purposes and should not be construed to limit the scope of the present disclosure.

Figure 1A:
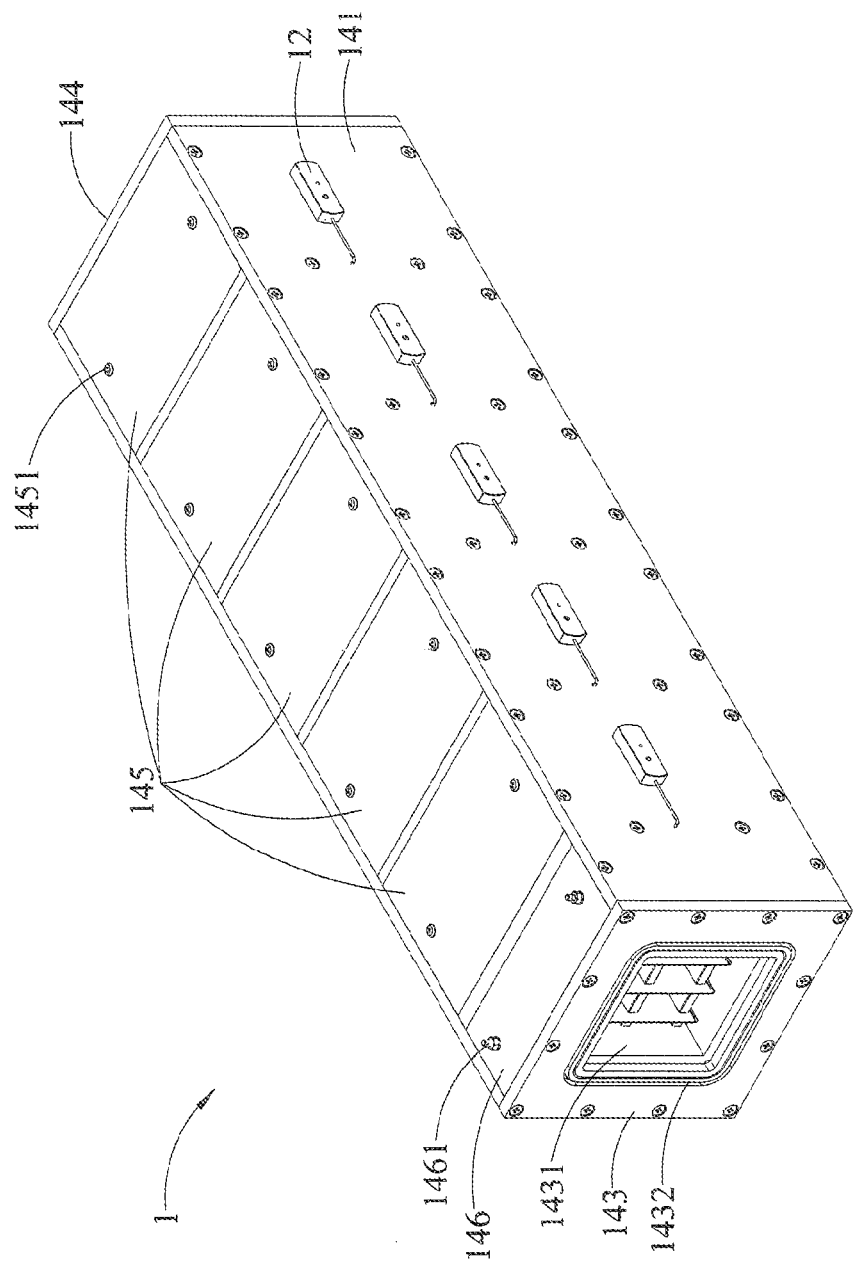
FIGS. 1A to 1C are schematic views of a layered temperature control dehumidifying element of the present disclosure.
Figure 1B:
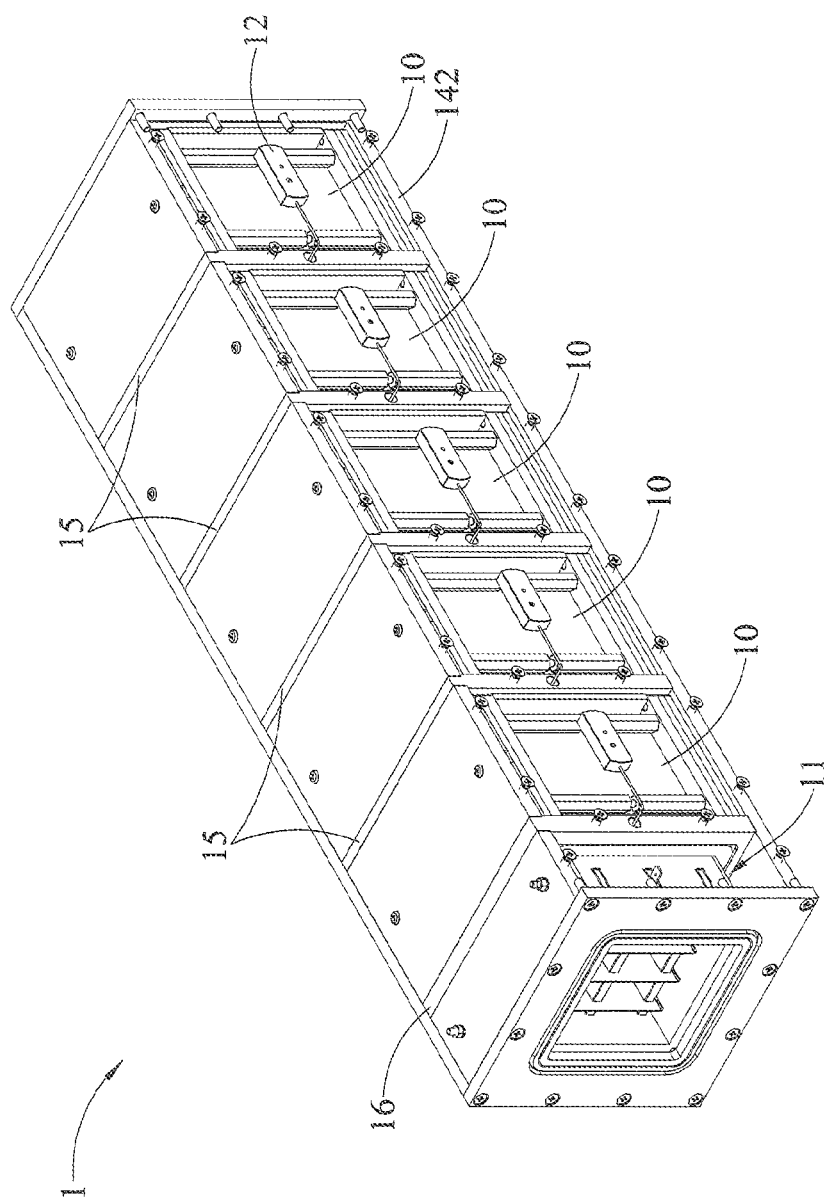
Figure 1C:
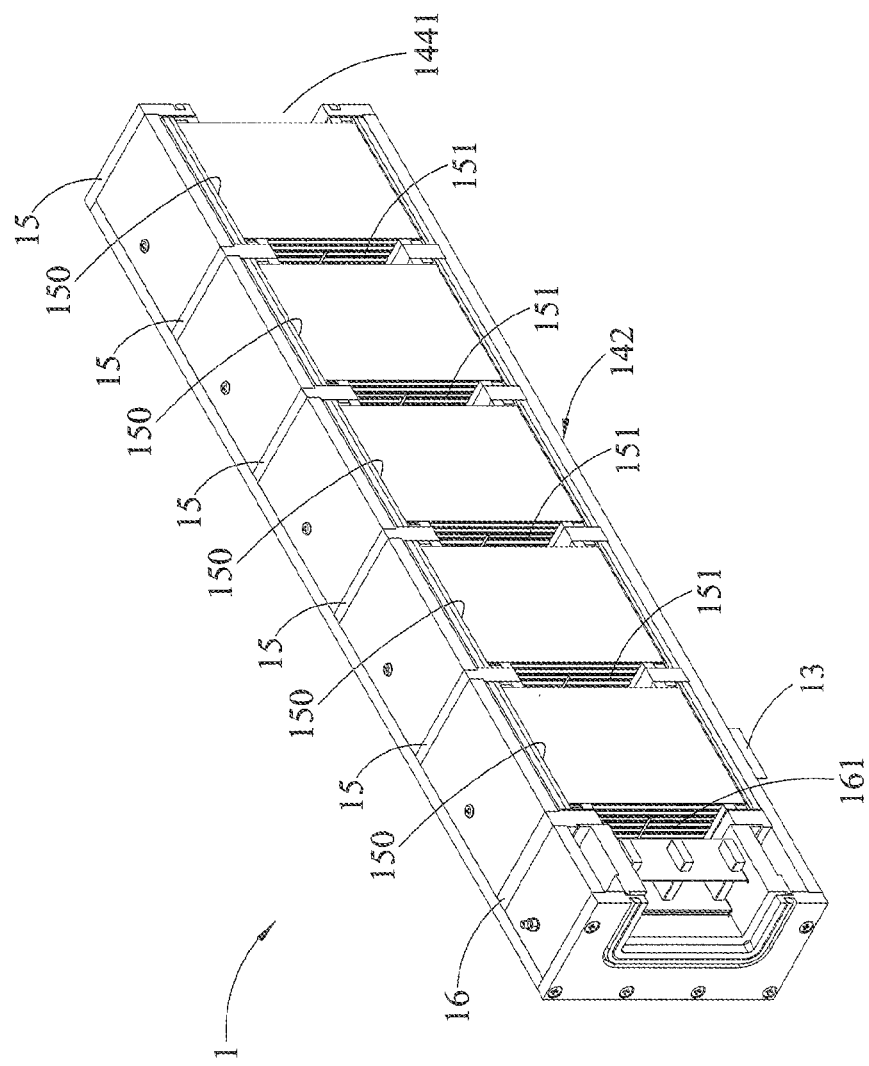

FIGS. 1A to 1C are schematic views of a layered temperature control dehumidifying element 1 of the present disclosure. FIG. 1A shows an outer structure of the layered temperature control dehumidifying element 1, FIG. 1B shows an inner structure of the layered temperature control dehumidifying element 1, and FIG. 1C shows a cross-sectional view of the layered temperature control dehumidifying element 1.

Referring to FIGS. 1A to 1C, the layered temperature control dehumidifying element 1 has a plurality of dehumidifying units 10, a preheater 11, a plurality of first temperature sensor connectors 12, and a second temperature sensor connector 13.

Each of the dehumidifying units 10 includes a direct heating desorbing material and is used for dehumidifying air by adsorption and capable of being regenerated by desorption. The dehumidifying units 10 are disposed in a plurality of air chambers 150, respectively. The air chambers 150 are separated from one another by at least a partition board 15 and a through hole 151 is formed at a central position of the partition board 15, thus allowing air to flow in parallel passages of the air chambers 150.

The preheater 11 is disposed at an air inlet end of the layered temperature control dehumidifying element 1 to perform preheating and temperature compensation on the dehumidifying units 10, thereby keeping the dehumidifying units 10 at a uniform temperature for regeneration.

The first temperature sensor connectors 12 are connected to first temperature sensors (not shown). The first temperature sensors are disposed at central positions of the dehumidifying units 10 to perform temperature monitoring and feedback during regeneration of the dehumidifying units 10. The first temperature sensor connectors 12 are disposed at one side of the layered temperature control dehumidifying element 1. The second temperature sensor connector 13 is connected to a second temperature sensor (not shown) that is disposed at an outlet port of the preheater 11 to perform temperature monitoring and feedback when the preheater 11 performs heating or temperature compensation. The second temperature sensor connector 13 is disposed at one side of the layered temperature control dehumidifying element 1.

In practice, the layered temperature control dehumidifying element 1 has an outer structure as shown in FIG. 1A. Referring to FIG. 1A, the layered temperature control dehumidifying element 1 has a side cover board 141, a bottom board 142, an air inlet end board 143, an air outlet end board 144, an upper cover board 145 and a preheater cover board 146. The components constitute a fixing frame of the layered temperature control dehumidifying element 1 and the inside of the fixing frame is separated by the partition boards 15 into the air chambers for receiving the dehumidifying units 10. As such, the layered temperature control dehumidifying element 1 has adsorption-based dehumidifying and desorption-based regenerating functions. Referring to FIG. 1C, the partition boards 15 have the through holes 151 that allow air to flow between the air chambers.

A preheater partition board 16 is provided and disposed in such a manner that an air chamber is formed between the preheater partition board 16 and the air inlet end board 143. The preheater 11 is disposed in the air chamber to perform preheating and temperature compensation for the layered temperature control dehumidifying element 1. The preheater 11 is, for example, a positive temperature coefficient (PTC) resistor or a common electric heating wire. The preheater partition board 16 has a through hole 161 that allows air to pass through. Further, the air inlet end board 143 has an air inlet port 1431 and the air outlet end board 144 has an air outlet port 1441. If necessary, the air inlet end board 143 has a gasket 1432 to ensure airtightness between the layered temperature control dehumidifying element 1 and the entire dehumidifying cavity. The air outlet end board 144 can also have a gasket (not shown).

The first temperature sensors are disposed at central positions of the dehumidifying units 10 and the first temperature sensor connectors 12 are fixed to one side of the frame of the layered temperature control dehumidifying element 1. The first temperature sensors perform temperature monitoring and feedback during regeneration of the dehumidifying units 10 of the layered temperature control dehumidifying element 1. The second temperature sensor is disposed on the bottom board 142 close to the outlet port of the preheater 11 and connected to the second temperature sensor connector 13 to perform temperature monitoring and feedback when the preheater 11 performs heating or temperature compensation. Further, the layered temperature control dehumidifying element 1 has a logic control circuit (not shown) connected to the preheater 11, the first temperature sensor connectors 12 and the second temperature sensor connector 13 to achieve a uniform temperature control on the dehumidifying units 10, which will be detailed later.

In order to supply power to the dehumidifying units 10 for regeneration, electrode screw sets 1451 are provided and connected to conductive plates (not shown) of the dehumidifying units 10 inside the layered temperature control dehumidifying element 1. Similarly, in order to supply power to the preheater 11 for heating, electrode screw sets 1461 are provided and connected to power lines of the preheater 11 inside the layered temperature control dehumidifying element 1.

Figure 2A:
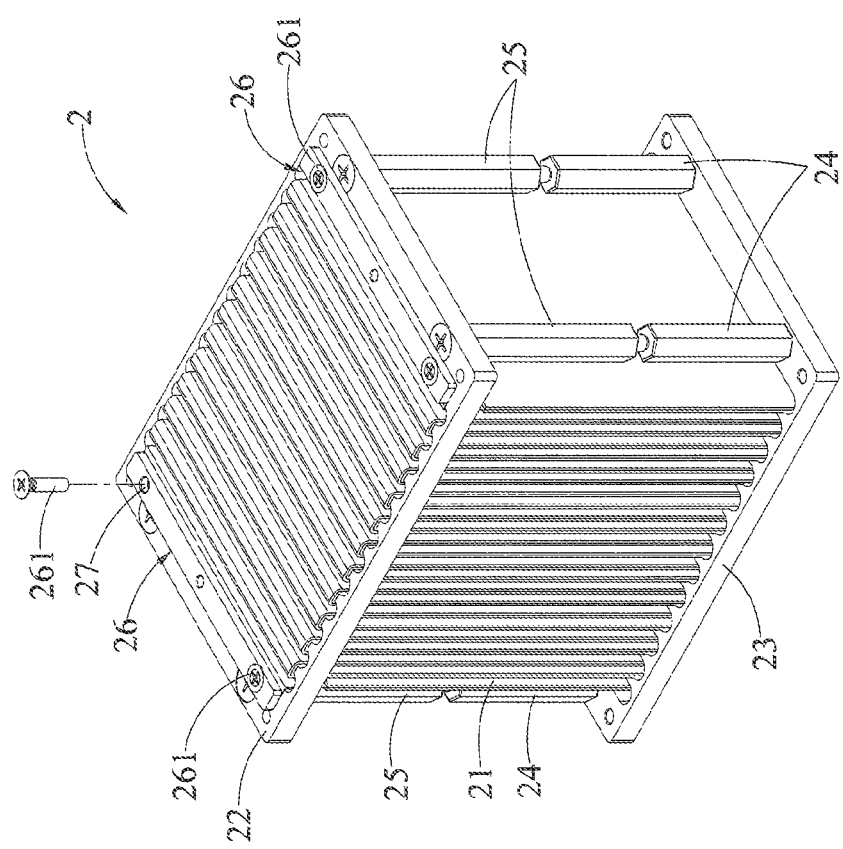
FIGS. 2A to 2C are schematic views of a dehumidifying unit of the layered temperature control dehumidifying element of the present disclosure.
Figure 2B:
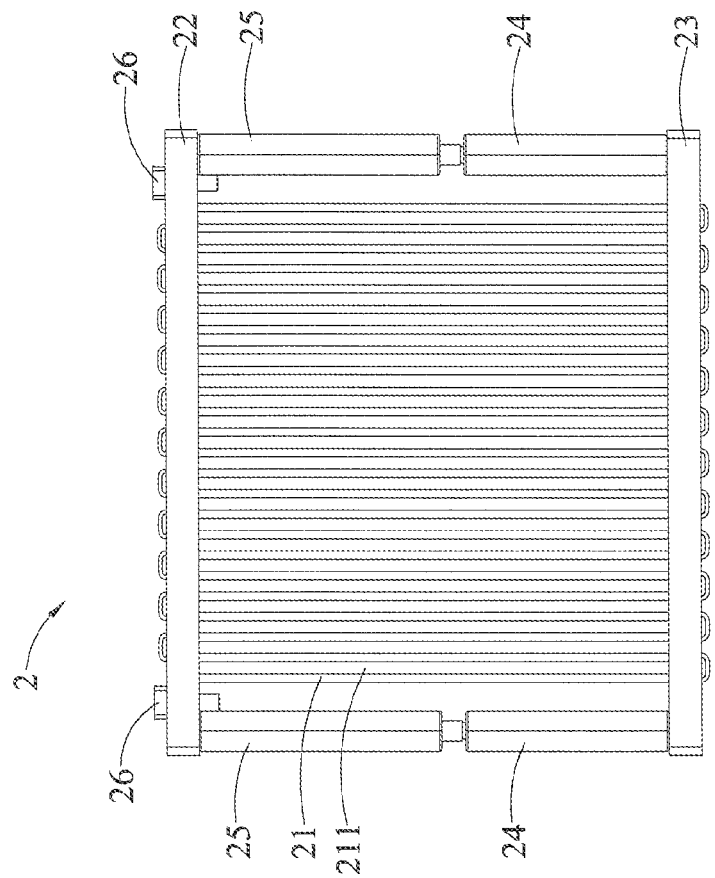
Figure 2C:
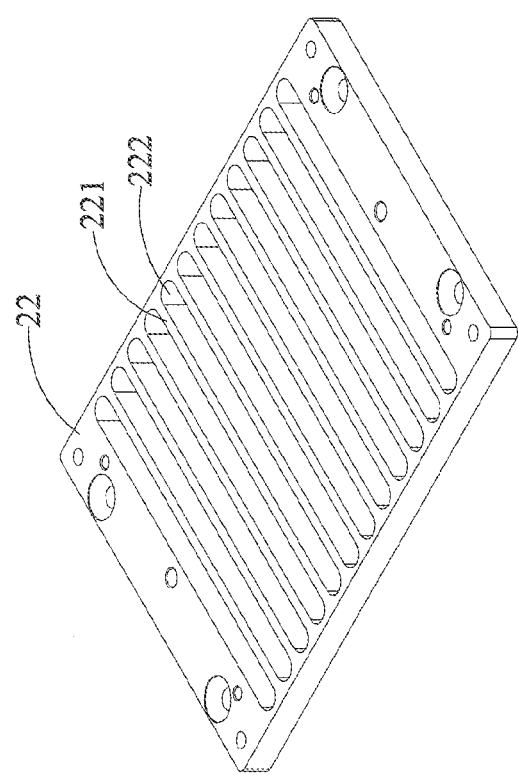

FIGS. 2A to 2C show disposing of the direct heating desorption material in the dehumidifying units of the layered temperature control dehumidifying element 1 according to the present disclosure. FIG. 2A shows an overall structure of a dehumidifying unit 2 (i.e., one of the dehumidifying units 10 of FIGS. 1A to 1C), FIG. 2B shows a front view of the dehumidifying unit 2, and FIG. 2C shows an upper frame of the dehumidifying unit 2.

Referring to FIGS. 2A to 2C, an upper frame 22 and a lower frame 23 are provided to fix a direct heating desorption material 21. The upper frame 22 and the lower frame 23 are tension-adjustable. Each of the upper frame 22 and the lower frame 23 has a plurality of rib portions 221 and a gap 222 is formed between any adjacent two of the rib portions 221. The direct heating desorption material 21 is wound back and forth in a U-shape on the rib portions 221 of the upper frame 22 and the lower frame 23 with a preferred gap of 1 to 10 mm The direct heating desorption material 21 has a metal sheet therein between two desorption sides of the direct heating desorption material. Portions of the metal sheet between the two desorption sides of the direct heating desorption material 21 are exposed and fixed by conductive plates 26, respectively, thus allowing current to flow into the direct heating desorption material 21 for direct heating desorption and regeneration. Regarding the detailed description of the direct heating desorption material, it can be referred to U.S. Pat. No. 8,747,528 issued Jun. 10, 2014 which is expressly incorporated by reference herein in its entirety and for all purposes.

In practice, the upper frame 22, the lower frame 23, a plurality of lower screw bolts 24 and a plurality of upper screw bolts 25 constitute a frame of the dehumidifying unit 2. In particular, the rib portions 221 of the upper frame 22 and the lower frame 23 serve as supporting and separating means. The direct heating desorption material 21 is passed through the gaps 222 and wound back and forth in a U-shape on the upper frame 22 and the lower frame 23, thus forming a plurality of parallel passages 211 therein and reducing component damage, as shown in FIG. 2B.

The direct heating desorption material 21 is stretched and tightened by rotating the upper screw bolts 25 and the lower screw bolts 24. Thereafter, the portions of the metal sheet between the two desorption sides of the direct heating desorption material 21 and the corresponding conductive plates 26 are fixed to the upper frame 22 by screw sets 261 to form two electrodes. Electrode screw holes 27 are formed on the conductive plates 26 and engaged with the electrode screw sets 1451 of FIG. 1A so as to guide current into the conductive plates 26 for regeneration. Further, an airtight foam (not shown) can be attached to the inlet and outlet ports of the dehumidifying unit 2 to improve the airtight effect.

Therefore, a preheater is used to achieve a uniform temperature effect on air passages of a layered temperature control dehumidifying element, thereby improving the desorption-based regeneration effect. In particular, to achieve the uniform temperature effect, a logic control circuit determines to perform a heating process, a cooling process or a temperature maintenance process according to a temperature sensing result.

Accordingly, the present disclosure provides a layered temperature control method to achieve a uniform temperature control on dehumidifying elements of a direct heating desorption type drying device. The method can perform a heating process, a cooling process and a temperature maintenance process.

During the heating process, a first dehumidifying unit of a dehumidifying element as well as a plurality of dehumidifying units in series connection with the first dehumidifying unit are heated by a preheater until the temperature reaches a temperature range for regeneration. Then, the heating process is stopped and the temperature maintenance process is performed. That is, if the dehumidifying element does not reach the specified temperature for regeneration, the preheater is activated to heat the dehumidifying units. Generally, the temperature range for regeneration is between 80 and 160. The temperature maintenance process is not performed until the dehumidifying element reaches the specified temperature range for regeneration.

During the temperature maintenance process, heating is activated or stopped according to temperature variation of the individual dehumidifying units so as to maintain the regeneration temperature within a tolerable range. Further, during the cooling process, the preheater is stopped from heating the dehumidifying units and cooling air is provided to accelerate cooling of the dehumidifying element.

A complete process flow for temperature control is detailed as follows.

Figure 3:
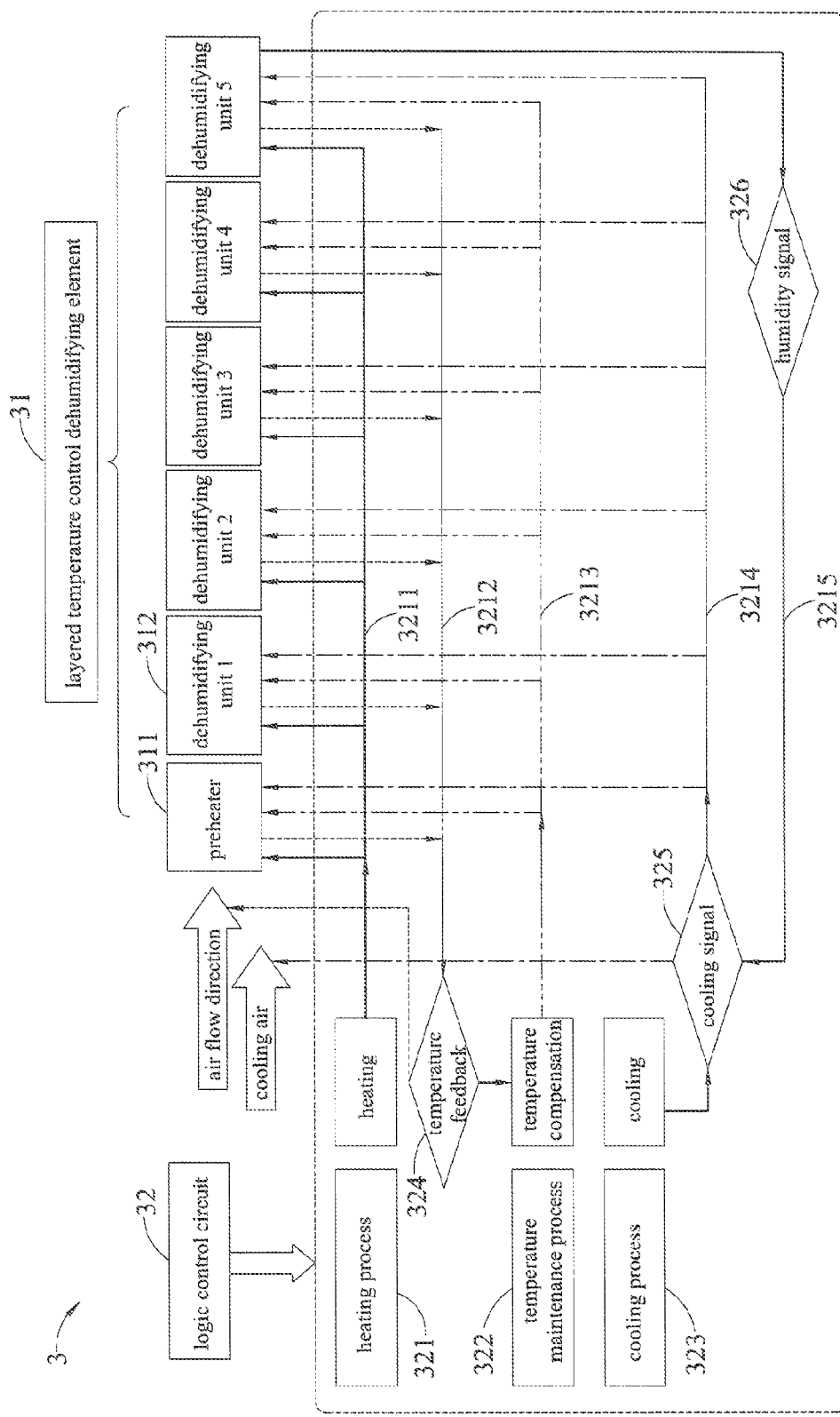
FIG. 3 is a schematic process flow of a layered temperature control method of the present disclosure.

FIG. 3 shows a process flow of the layered temperature control method of the present disclosure. Referring to FIG. 3, a layered temperature control dehumidifying element 31 and a logic control circuit 32 are shown. The layered temperature control dehumidifying element 31 has a preheater 311 and a plurality of dehumidifying units 312. The preheater 311 is used to provide heat for preheating and temperature compensation of the layered temperature control dehumidifying element 31. The dehumidifying units 312 are made of a direct heating desorption material so as to provide adsorption-based dehumidifying and desorption-based regenerating functions.

The logic control circuit 32 can perform a heating process 321, a temperature maintenance process 322 and a cooling process 323.

The heating process 321 provides a heating signal when the layered temperature control dehumidifying element 31 is to perform a desorption-based regenerating process. The heating signal activates the power source through a heating control circuit 3211 so as to cause the preheater 311 to heat the dehumidifying units 312. Temperature signals of the dehumidifying units 312 are sent to a temperature feedback processor 324 through a temperature feedback circuit 3212 so as for a determining process to be performed. If the temperature reaches the required regeneration temperature, the power source is switched off to stop heating the dehumidifying units 312, and an air flow is activated so as for the layered temperature control dehumidifying element 31 to perform the desorption-based regenerating process. When the temperature is lower than the required regeneration temperature, the temperature feedback processor 324 activates the temperature maintenance process 322 to allow the preheater 311 to make temperature compensation for the dehumidifying units 312 by intermittently switching on/off the power source. The heating time is adjusted according to the signal of the temperature feedback circuit 3212. As such, the overall flow passage of the layered temperature control dehumidifying element 31 is maintained at a constant regeneration temperature.

Further, the regeneration process of the layered temperature control dehumidifying element 31 is stopped through humidity control. A humidity signal from a humidity sensor mounted to a last group of the dehumidifying units 312 is sent through a humidity signal circuit 3215 to a humidity feedback processor 326. If it is determined that the humidity reaches a predefined humidity value, a cooling processor 325 is activated to perform the cooling process, which includes switching off the preheater 311 and stopping heating the dehumidifying units 312 and stopping supplying air for regeneration. Further, a cooling air can be provided for the cooling process so as to accelerate cooling of the layered temperature control dehumidifying element 31 and facilitate another adsorption-based dehumidifying process. Otherwise, if the layered temperature control dehumidifying element 31 has a high temperature, moisture adsorption will be adversely affected.

By using hardware, such as a PLC (programmable logic controller) or a personal computer, the logic control circuit 32 can control the desorption-based regenerating process of the layered temperature control dehumidifying element 31 through a transmission interface.

Figure 4:
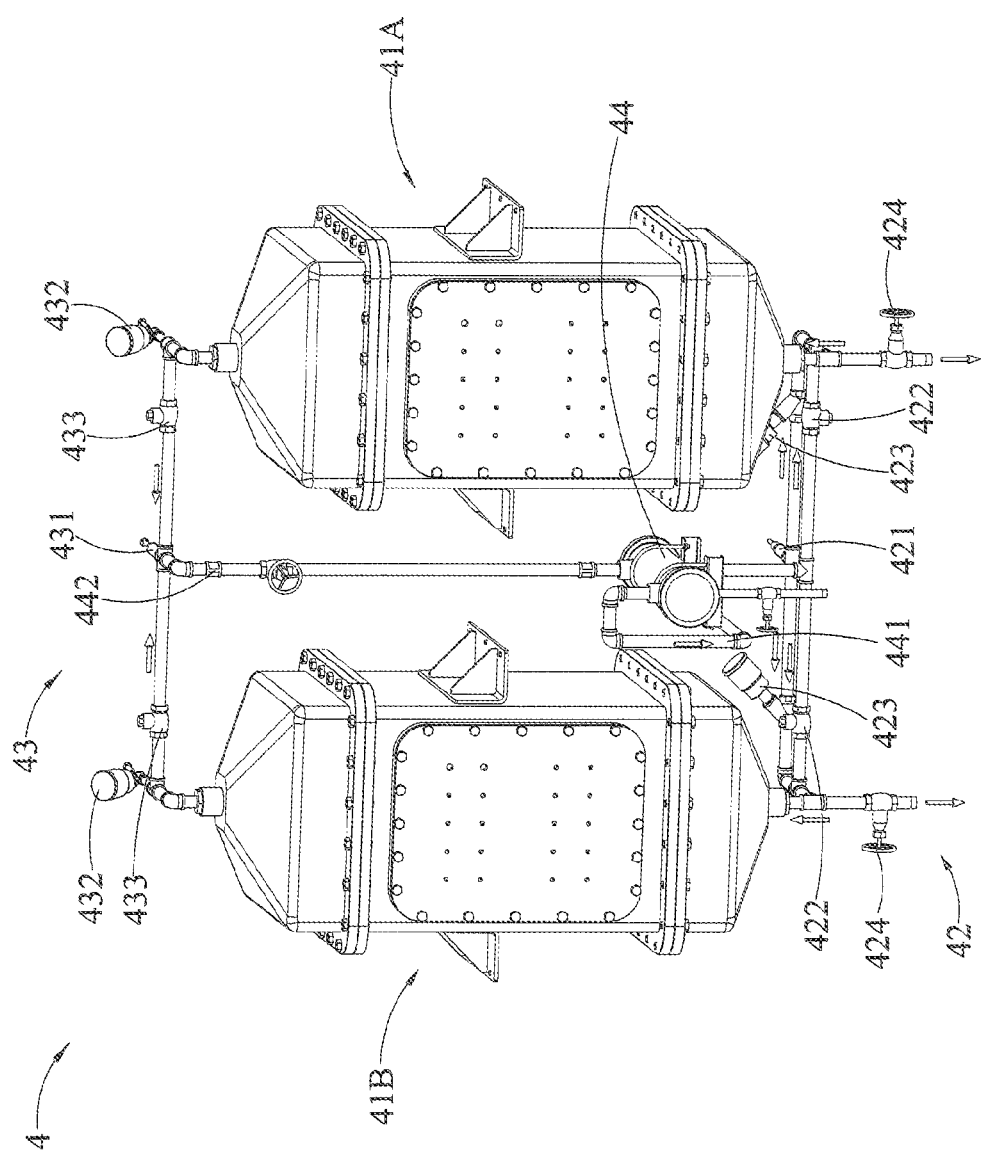
FIG. 4 is a schematic view of a direct heating desorption type drying device of the present disclosure.

FIG. 4 is a schematic view of a direct heating desorption type drying device of the present disclosure. Referring to FIG. 4, the direct heating desorption type drying device 4 has two direct heating desorption type drying components 41A, 41B, an air inlet pipeline group 42, an air outlet pipeline group 43, and a heat exchanger 44. The air outlet pipeline group 43 is positioned over the air inlet pipeline group 42. Generally, one of the direct heating desorption type drying components 41A, 41B performs a dehumidifying process while the other performs regenerating by desorption. Air can be controlled to flow into either of the direct heating desorption type drying components 41A, 41B through valves or switches.

In particular, the direct heating desorption type drying components 41A, 41B are connected to the air inlet pipeline group 42 and external air is allowed to enter into the direct heating desorption type drying components 41A, 41B through pipelines 421 for dehumidifying or regenerating. By switching on/off valves 423, external humid air can be guided into the direct heating desorption type drying component 41A or 41B for a dehumidifying process. By switching on/off valves 422, condensed air with lower temperature and low humidity from the heat exchanger 44 or external air can be guided into the direct heating desorption type drying component 41A or 41B for regenerating dehumidifying elements. Further, by switching on/off valves 424, moisture remaining on the bottom of the direct heating desorption type drying component 41A or 41B can be discharged.

The direct heating desorption type drying components 41A, 41B can change between dehumidifying and regenerating processes by alternately switching on/off valves 432, 433. Therein, when the direct heating desorption type drying component 41A performs a dehumidifying process, the valves 432, 423 on the upper and lower sides thereof are switched on and the valve 433 on the upper side thereof and the valve 423 on the lower side of the direct heating desorption type drying component 41B are switched off. After the dehumidifying process, dehumidified air can be guided into a reservoir for storage. Further, when the direct heating desorption type drying component 41B performs regenerating by desorption, the valves 433, 422 on the upper and lower sides thereof are switched on, and the valve 432 on the upper side thereof and the valve 422 on the lower side of the direct heating desorption type drying component 41A are switched off. High-temperature high-humidity air after the regenerating process can be guided into the heat exchanger 44 through pipelines 442 and condensed into low-temperature low-humidity air that is further guided into the direct heating desorption type drying component 41B for regeneration. Alternatively, the high-temperature high-humidity air generated after the process can be discharged through pipelines 431. When the drying device stops operation, switches 424 below the direct heating desorption type drying component 41A or 41B and the heat exchanger 44 can be turned on to discharge condensed liquid.

The direct heating desorption type drying components 41A, 41B can change between dehumidifying and regenerating processes by alternately switching on/off the valves 432, 433. When a valve 432 is switched on, dehumidified air after the dehumidifying process of the corresponding direct heating desorption type drying component is guided through the pipelines 431 to a reservoir for storage. In addition, if a valve 433 is switched on, high-temperature high-humidity air after the regenerating process of the corresponding direct heating desorption type drying component is guided into the heat exchanger 44 through the pipelines 442 for moisture condensation.

Condensed low-temperature air is guided through pipelines 441 into the direct heating desorption type drying component 41A or 41B again for regeneration. Further, air condensed by the heat exchanger 44 facilitates to accelerate cooling of the dehumidifying elements of the direct heating desorption type drying component 41A or 41B, thus shortening the regenerating process and allowing the dehumidifying elements to be quickly ready for another dehumidifying process.

In particular, the direct heating desorption type drying components 41A, 41B are connected in parallel. The valves on the air inlet pipeline group 42 and the air outlet pipeline group 43 are switched on/off to control inlet of air into a pressure tank of the direct heating desorption type drying component 41A, 41B. The pressure tank has a plurality of dehumidifying elements arranged in an array. Each of the dehumidifying elements has a preheater for performing preheating and temperature compensation on the dehumidifying element. Air inlet and outlet ports of the pressure tank are connected to the air inlet pipeline group 42 and the outlet pipeline group 43, respectively. Air is sent into the pressure tank so as to be dehumidified by dehumidifying units of the dehumidifying elements or used for regeneration of the dehumidifying units. The inner structure of the direct heating desorption type drying component 41A, 41B will be detailed later.

Further, the direct heating desorption type drying device 4 can have a fixing member (not shown) for fixing the air inlet pipeline group 42, the air outlet pipeline group 43 and the direct heating desorption type drying components 41A, 41B.

Figure 5A:
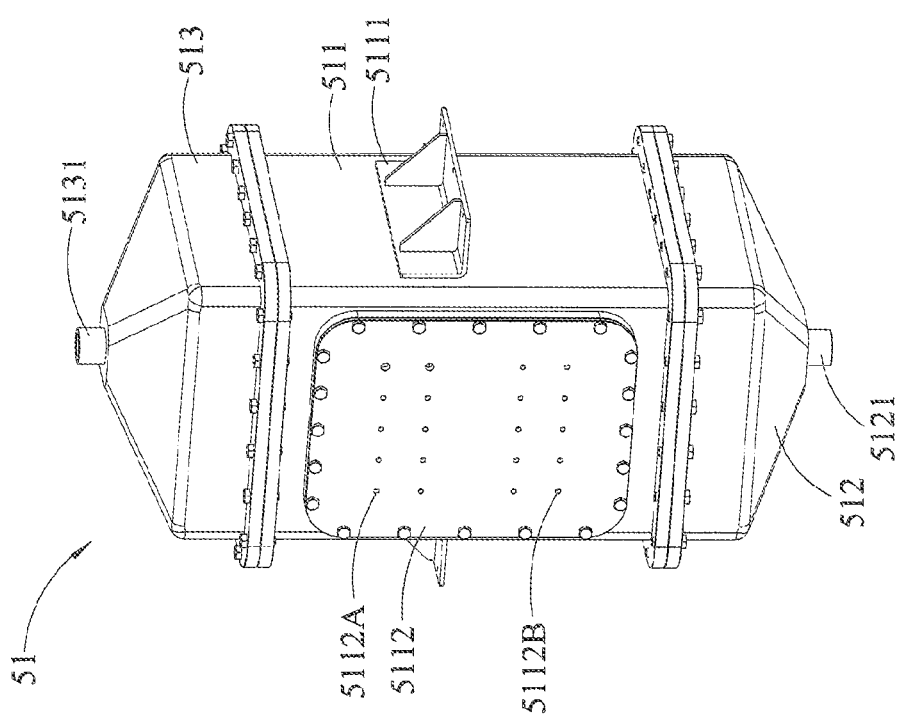
FIGS. 5A to 5C are schematic views of a direct heating desorption type drying component of the direct heating desorption type drying device of the present disclosure.
Figure 5B:
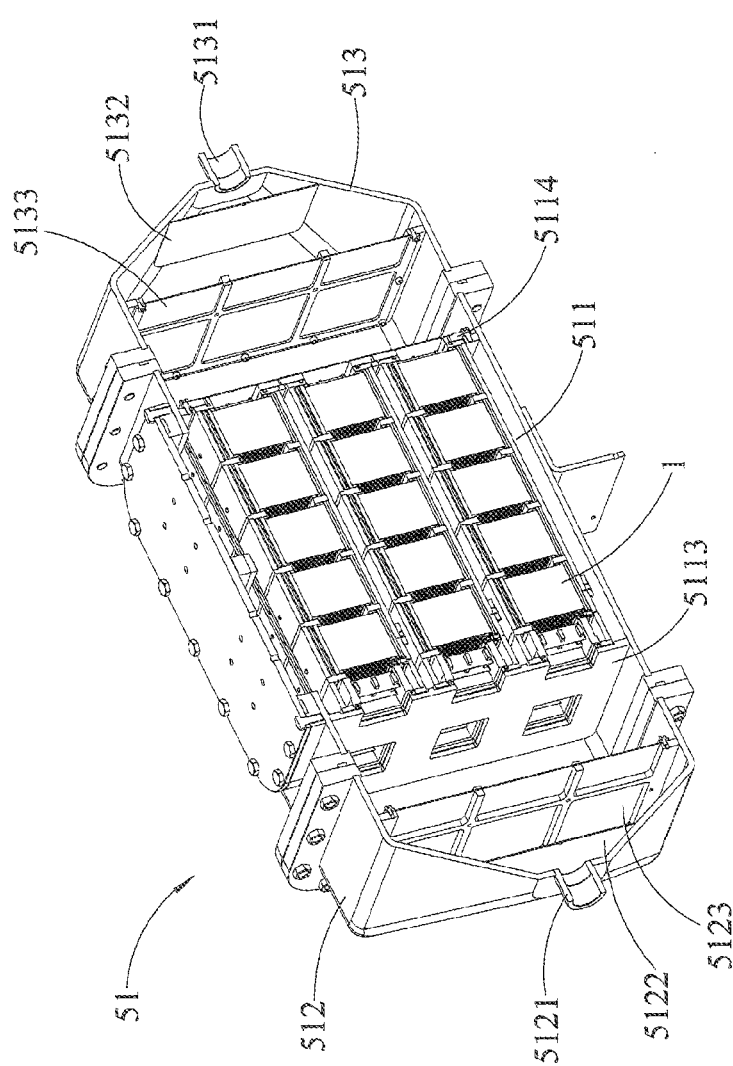
Figure 5C:
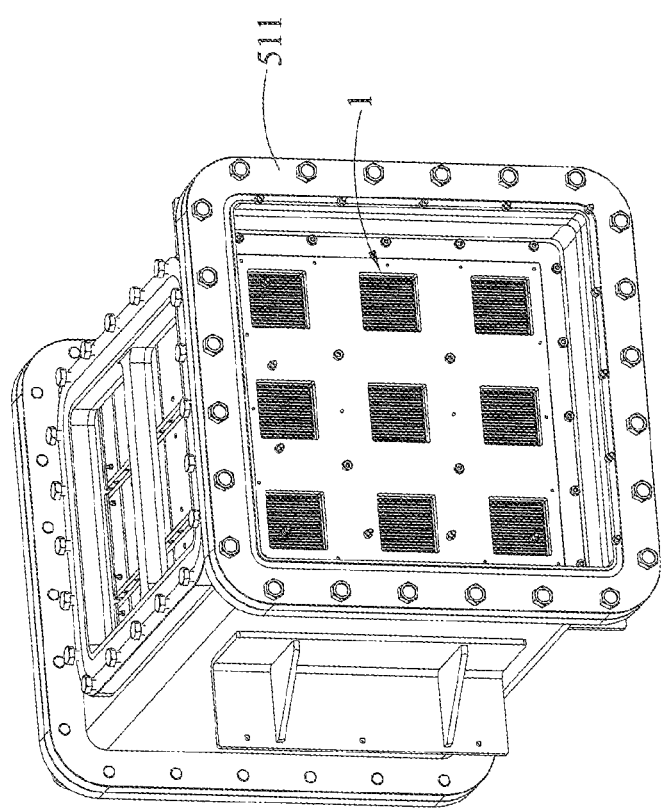

FIGS. 5A to 5C are schematic views of a direct heating desorption type drying component of the direct heating desorption type drying device. FIG. 5A shows an outer structure of the direct heating desorption type drying component 51 (i.e., the direct heating desorption type drying component 41A or 41B of FIG. 4), FIG. 5B shows a cross-sectional view of the direct heating desorption type drying component 51, and FIG. 5C shows layered temperature control dehumidifying elements inside the direct heating desorption type drying component 51.

The direct heating desorption type drying component 51 has a base body 511, an air inlet hopper 512, and an air outlet hopper 513. The base body 511 is fixed to the frame of the direct heating desorption type drying device 4 through a holding member 5111. A connection plate 5112 is disposed at one side of the base body 511. The connection plate 5112 is detachable from the base body 511 so as to facilitate mounting of the dehumidifying elements 1 inside the base body 511. The connection plate 5112 further has a plurality of temperature connector groups 5112A connected to the temperature sensor groups of the layered temperature control dehumidifying elements 1. Furthermore, the connection plate 5112 has power connector groups 5112B connected to the dehumidifying units and preheaters of the layered temperature control dehumidifying elements 1 so as to supply power to the layered temperature control dehumidifying elements 1.

The base body 511 has a base board 5113 disposed at the bottom air inlet end and a cover board 5114 disposed at the top air outlet end. During assembly, the layered temperature control dehumidifying elements 1 can be closely arranged with gaskets that are provided on upper and lower ends thereof for positioning and airtightness. The air inlet end of the base body 511 is connected to the air inlet hopper 512. The air inlet hopper 512 has an air inlet port 5121 connected to air inlet pipelines for guiding air into the base body 511. Further, the air inlet hopper 512 has an orifice plate 5122 and a diffusion net 5123. The orifice plate 5122 has a large-sized orifice and the diffusion net 5123 has a small-sized hole so as to facilitate uniform diffusion of air and improve the efficiency of contact between the air and dehumidifying elements.

The air outlet end of the base body 511 is connected to an air outlet hopper 513. The air outlet hopper 513 has an air outlet port 5131 connected to air outlet pipelines so as to guide air after a dehumidifying or regenerating process out of the base body 511. Further, the air outlet hopper 513 has a filtering net 5133 and an orifice plate 5132 disposed therein for filtering out dust and impurity and clean the air. The layered temperature control dehumidifying elements 1 are arranged in an array inside the base body 511.

Therefore, the present disclosure provides a dehumidifying unit, a layered temperature control dehumidifying element, a drying device and a layered temperature control method. By performing preheating through a preheater and performing the layered temperature control method on the dehumidifying element, the present disclosure achieves a uniform temperature effect on the air flow passage of the dehumidifying element, thus improving regeneration performance of the dehumidifying element and reducing energy consumption.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A layered temperature control method for performing a uniform temperature control on a dehumidifying element of a direct heating desorption type drying device during regeneration, comprising the steps of:
    performing a heating process, wherein a first dehumidifying unit of the dehumidifying element is heated by a preheater and thereby a plurality of dehumidifying units connected in series with the first dehumidifying unit are heated until the temperature of the dehumidifying element reaches a temperature range for regeneration;
    performing a temperature maintenance process, wherein heating is activated or stopped according to temperature variation of the individual dehumidifying units so as to maintain the regeneration temperature within a tolerable range; and
    performing a cooling process, wherein the preheater is stopped from heating the dehumidifying units and cooling air is provided to accelerate the cooling of the dehumidifying element.

2. The method of claim 1, further comprising mounting a humidity sensor to a last group of dehumidifying units for sensing air humidity and generating a humidity signal, thus allowing the cooling process to be performed when the air humidity is below a predefined humidity value.

3. A direct heating desorption type drying device, comprising:
    an air inlet pipeline group;
    an air outlet pipeline group positioned over the air inlet pipeline group;
    a plurality of direct heating desorption type drying components connected in parallel, wherein, valves of the air inlet pipeline group and the air outlet pipeline group are switched on/off to control air flowing into pressure tanks of the direct heating desorption type drying components, wherein each of the pressure tanks has a plurality of dehumidifying elements and each of the dehumidifying elements has a preheater to perform preheating and temperature compensation on the dehumidifying element, the pressure tank has air inlet and outlet ports connected to the air inlet and outlet pipeline groups, respectively, and the air flowing into the pressure tank is dehumidified by dehumidifying units of the dehumidifying elements of the pressure tank through adsorption or is used to regenerate the dehumidifying units by desorption; and
    a heat exchanger in communication with the air inlet pipeline group, the air outlet pipeline group and the valves to condense high-temperature high-humidity air after regeneration of the direct heating desorption type drying components and accelerate cooling of the dehumidifying units.

4. The device of claim 3, wherein the pressure tank further has a base body, an air inlet hopper having an air inlet orifice plate and a diffusion net that allow air to uniformly flow into the dehumidifying elements, and an air outlet hopper having a filtering net and an air outlet orifice plate for filtering out dust and impurity in the air.

5. The device of claim 4, wherein the pressure tank has a connection plate disposed at one side of the base body to facilitate mounting of the dehumidifying elements, and the connection plate further has temperature connector groups connected to temperature sensor groups of the dehumidifying elements in the base body and power connector groups connected to the dehumidifying elements and the preheaters in the base body to supply power to the dehumidifying elements and the preheaters.

6. The device of claim 5, wherein the temperature sensor groups and the preheaters are connected to a logic control circuit to achieve a uniform temperature control on the dehumidifying elements.

7. The device of claim 3, wherein the dehumidifying elements are arranged in an array in the pressure tank.

8. The device of claim 3, wherein the direct heating desorption type drying components change between dehumidifying and regenerating processes by alternately switching on/off two or more valves.

9. The device of claim 3, wherein each of the dehumidifying elements is a layered temperature control dehumidifying element, comprising:
  a plurality of dehumidifying units comprising a direct heating desorption material and used for dehumidifying air by adsorption and capable of being regenerated by desorption, wherein the dehumidifying units are respectively disposed in a plurality of air chambers that are separated from one another by at least a partition board, and through holes are formed between the air chambers to allow air to pass through and flow in parallel passages of the air chambers, and wherein the preheater is disposed at an air inlet end of the layered temperature control dehumidifying element to perform preheating and temperature compensation on a first group of the dehumidifying units and thereby keep the first group of the dehumidifying units at a uniform temperature for regeneration;
  a plurality of first temperature sensors respectively disposed at central positions of the dehumidifying units to perform temperature monitoring and feedback during regeneration of the dehumidifying units, wherein the first temperature sensors have connectors disposed at one side of the layered temperature control dehumidifying element; and
  a second temperature sensor disposed at an outlet port of the preheater to perform temperature monitoring and feedback when the preheater performs heating or temperature compensation.

10. The device of claim 9, further comprising a logic control circuit connected to the preheater, the first temperature sensors and the second temperature sensor to perform a uniform temperature control on the dehumidifying units.

11. The device of claim 9, wherein the direct heating desorption material is fixed to each of the dehumidifying units by a tension-adjustable frame, and the direct heating desorption material is passed through gaps between rib portions of the frame so as to be wound back and forth in a U-shape on the rib portions of the frame.

12. The device of claim 9, further comprising a fixing frame having a side cover board, a bottom board, an air inlet end board, an air outlet end board, an upper cover board and a preheater cover board, the inside of the fixing frame is separated by the partition boards into the air chambers for receiving the dehumidifying units.

13. The device of claim 12, wherein two ends of the direct heating desorption material are conductively connected to conductive plates, respectively, and electrode screw holes are formed in the conductive plates and engaged with electrode screw sets of the upper cover board so as to allow current to flow into the conductive plates for regeneration of the direct heating desorption material.

14. The device of claim 9, wherein each of the dehumidifying units further comprising:
  an upper frame and a lower frame each having a plurality of rib portions, wherein a gap is formed between any adjacent two of the rib portions;
  a plurality of upper screw bolts and lower screw bolts fixed to the upper frame and the lower frame respectively, wherein the direct heating desorption material is wound around the rib portions of the upper frame and the lower frame alternately to form a passage therebetween, and wherein the direct heating desorption material has a metal sheet therein between two desorption sides of the direct heating desorption material; and
  two conductive plates conductively connected to portions of the metal sheet exposed from the two desorption sides of the direct heating desorption material and fixed to the upper frame to form two electrodes.

15. The device of claim 14, wherein the direct heating desorption material is passed through the gaps between the rib portions of the upper frame and the lower frame.

16. The unit of claim 14, wherein the direct heating desorption material is stretched and tightened by rotating the plurality of upper screw bolts and lower screw bolts.

17. The unit of claim 14, wherein the two conductive plates and the corresponding portions of the metal sheet are fixed to the upper frame by screw sets, and an electrode screw hole is formed in each of the conductive plates to allow current to flow into the conductive plates.

18. The unit of claim 14, wherein the portions of the metal sheet between the two desorption sides of the direct heating desorption material are exposed and fixed by conductive plates, respectively.

19. The unit of claim 14, wherein the direct heating desorption material is wound back and forth in a U-shape.

20. The unit of claim 19, wherein the passage formed therebetween is of a width of 1 to 10 mm.

* * * * *